5 Sheets—Sheet 1.

G. P. GORDON.

PRINTING-PRESS.

No. 6,945. Reissued Feb. 22, 1876.

WITNESSES.

Henry R Gordon

C. P. Gordon

George P. Gordon by A. Sidney Doane atty

INVENTOR.

5 Sheets—Sheet 2.

G. P. GORDON.

PRINTING-PRESS.

No. 6,945. Reissued Feb. 22, 1876.

WITNESSES.

Henry R. Gordon

C. D. Gordon

George P. Gordon by A. Sidney Doane atty

INVENTOR.

5 Sheets—Sheet 3.

G. P. GORDON.

PRINTING-PRESS.

No. 6,945.

Reissued Feb. 22, 1876.

WITNESSES.

Henry R Gordon

C. O. Gordon

George P. Gordon by A Sidney, Brown atty

INVENTOR.

5 Sheets—Sheet 4.

G. P. GORDON.

PRINTING-PRESS.

No. 6,945. Reissued Feb. 22, 1876.

WITNESSES.

Henry R. Gordon

C. O. Gordon

George P. Gordon per A. Gilmy Drake atty

INVENTOR.

G. P. GORDON.

PRINTING-PRESS.

No. 6,945. Reissued Feb. 22, 1876.

WITNESSES.

Henry R. Gordon
C. A. Gordon

George P. Gordon by A. Fitzhugh, Dean atty

INVENTOR.

UNITED STATES PATENT OFFICE.

GEORGE P. GORDON, OF BROOKLYN, NEW YORK.

IMPROVEMENT IN PRINTING-PRESSES.

Specification forming part of Letters Patent No. 149,113, dated March 31, 1874; reissue No. 6,945, dated February 22, 1876; application filed November 10, 1875.

*To all whom it may concern:*

Be it known that I, GEORGE P. GORDON, of Brooklyn, Kings county, New York, did invent, make, and apply to use certain new and useful Improvements in the Construction of Printing-Presses, (for which Letters Patent were granted T. D. Jermain in England, September 7, 1871, numbered 2,369;) and that the following is a full, clear, and correct description of the same, reference being had to the accompanying drawings, making part of this specification, and to the letters of reference marked thereon, in which—

Figure 1:
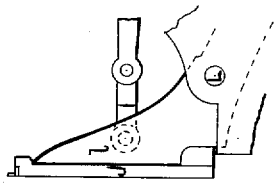
Figure 1:
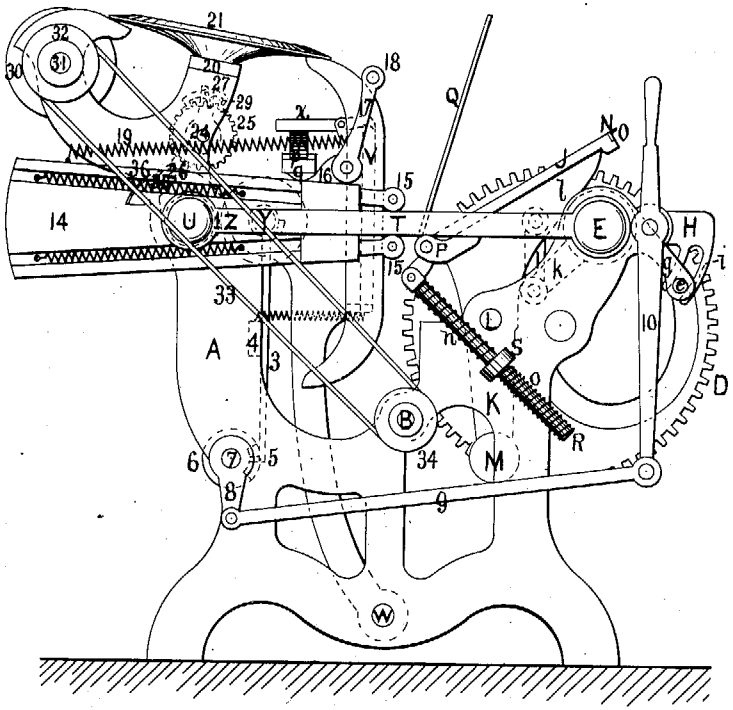
Figure 2:
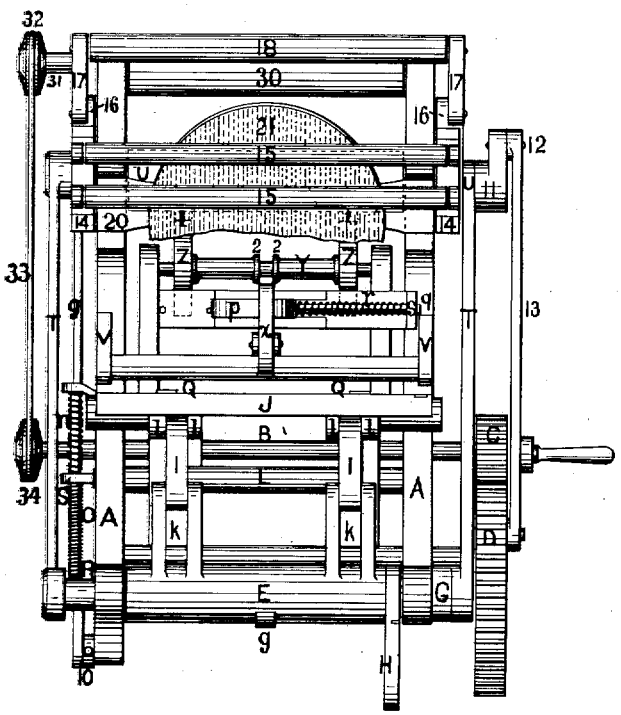
Figure 3:
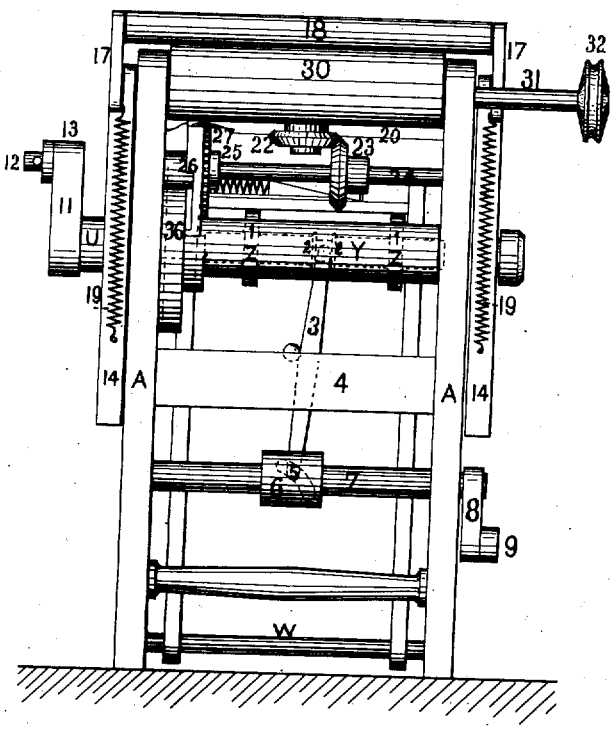
Figure 4:
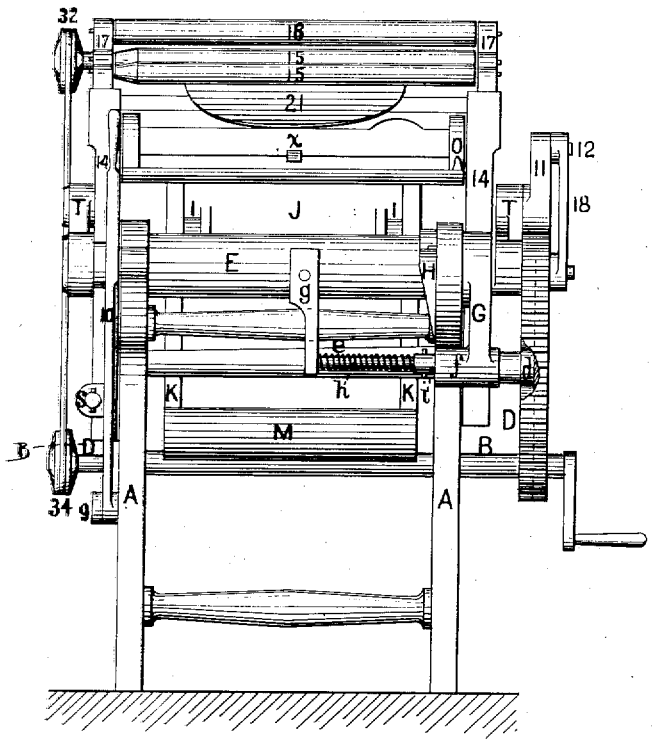
Figure 5:
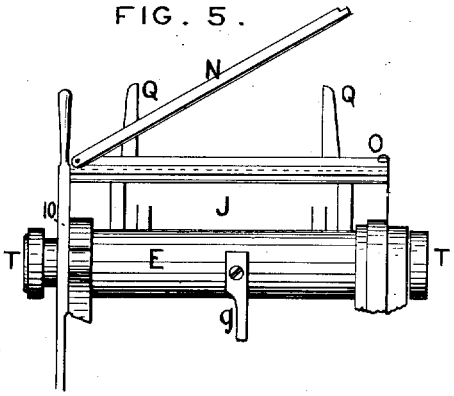
Figure 6:
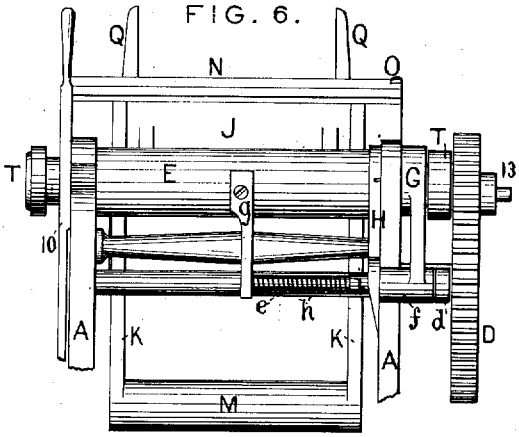
Figure 7:
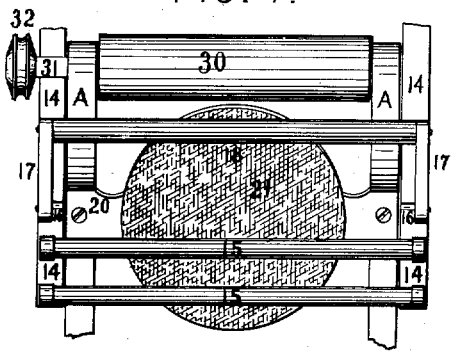
Figure 8:
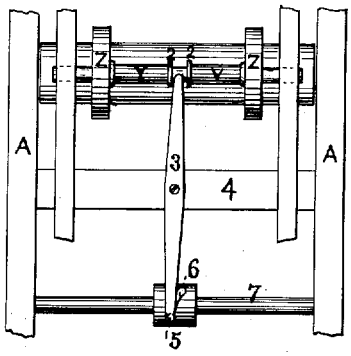
Figure 9:
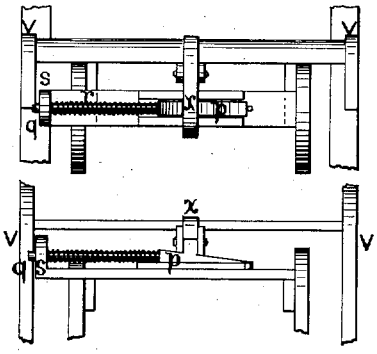

Figure 1 is a side elevation of my improved printing-press. Fig. 2 is a top view of the same. Fig. 3 is a rear view of the same. Fig. 4 is a front view of the same. Fig. 5 is a view showing the construction of the platen-bails. Fig. 6 is a view of the means employed to suspend the operation of the platen. Fig. 7 is a view of the revolving ink-table and supplemental ink-feed roller. Fig. 8 is a view of the means employed to suspend the operation of the bed. Fig. 9 are views showing the operation of the device for closing the chase-hook upon the chase.

In the drawings like parts of the invention are pointed out by the same letters of reference.

The nature of the present invention consists in certain improvements in the construction of printing-presses, as more fully hereinafter set forth.

To enable those skilled in the arts to make and use my invention, the following description of its construction and operation will be found sufficient.

A shows the frame of my improved printing-press, intended to support the operative parts of the machine, and made sufficiently heavy for such purpose. B is the driving-shaft, for giving motion to the machine, held in the frame A. Upon one end of the shaft B is keyed a pinion, C, gearing into a cog-wheel, D, secured upon a shaft, E, also held in the frame A. This cog-wheel D has a cam cut upon its inner side, in which a roller, *d*, secured upon the stud-rod *e*, moves or plays as the wheel D revolves. The stud-rod, upon which is the roller *d*, is inserted in a sleeve, *f*, upon the crank-arm G, which crank-arm is keyed upon the shaft E. The opposite end of the stud-rod is passed through a support, *g*, secured upon the shaft E, and has passed over it a helical spring, *h*, one end of which bears against the inner side of the support, while its opposite end bears against a shoulder upon the rod, through which is passed a pin, *i*. Hung upon the shaft E is a rocking-wedge, H, free to move either upward or downward, as may be desired, the pins upon the frame A, between which it is hung, governing the extent of its upward or downward movement. E shows a shaft held in boxes upon the frame A, upon which the crank-arm G and support *g* for the rod-stud are secured, and upon which, also, the rocking-wedge H is hung. Upon this shaft E are the lugs *k*, in the forward ends of which are secured the rear ends of the toggles I, the forward ends of the same being held in the lugs *l*, upon the rear of the platen J. J shows the platen of the press, to receive the sheet to be printed. This platen is provided with the levers K, through which the shaft L passes, and between the rear ends of which a counter-balance, M, counter-balancing the weight of the platen, is secured. The shaft L is placed back of the face-line of the platen J, its center being at a right angle from the lower edge of the platen, and it is thus placed that the platen may move over or through a small arc of a circle, and yet be moved sufficiently from the bed to allow the free passage of the inking-rollers with a short vibration or movement of the bed. N shows one of two bails employed by me, one upon the upper, and the other upon the lower, side of the platen, to secure the tympan-sheet and packing upon said platen. The bail is swiveled at one end to the platen, and its lower edge is made V-shaped, the platen being provided with a V-shaped groove, into which the bail fits snugly when closed in position upon the platen, the tympan-sheet and packing employed having its end clamped firmly between the V-shaped groove and the V-shaped edge of the bail, which, when closed in position, may be held by turning the button O over one end of the bail N.

Such a construction of bail, snugly fitting the V-shaped groove in the platen, serves to hold the tympan-sheet and packing firmly in position, and to prevent the slipping of the packing beneath the tympan-sheet, which is of frequent occurrence where bails constructed in the usual manner are employed. P shows a griper-frame, to receive the gripers Q, employed to relieve the printed sheet from the form or types. This griper-frame is held in ears secured upon the under side of the platen, and is free to turn in these ears. Upon one end of the griper-frame is secured one end of a rod, R, which rod passes through a swiveled eye, S, inserted in the side of the frame A. This swiveled eye forms a bearing for two spiral springs, *n* and *o*, the one, *n*, being made heavier than the other, *o*, and passed over the upper portion of the rod R, and the other, *o*, passing over the lower portion of the rod R. The spring *n* is confined between the shouldered portion of the rod R and the upper side of the swiveled eye S, and the spring *o* is confined between the lower or under side of the swiveled eye, and a pin passed through the lower portion of the rod.

The construction of the griper-frame and its auxiliaries, as just set forth, admits of the gripers being closed upon the platen when in position to receive the sheet to be printed, in which case the spring *o* will be compressed as the gripers are closed upon the face of the platen, and after the gripers have been adjusted upon the frame the expansion of this spring upon the rod will cause the gripers to return to the vertical, or nearly vertical, position they previously occupied, the spring *n*, in this case, governing the extent of the forward movement, or movement from the face of the platen toward the bed of the press, which the gripers and frame will have.

When the platen, during the operation of the press, is rocked or turned down and assumes a vertical position, the spring *n* is compressed between the shouldered portion of the rod and the swiveled eye, thus causing the gripers to gripe the sheet upon the platen and to relieve it from the type, and upon the return movement of the platen this spring is expanded, and the gripers assume the vertical, or nearly vertical, position they previously occupied.

The swiveled eye, in both instances cited, turns freely in the side of the frame A, and accommodates itself to the movement of the griper-frame.

Over the ends of the shaft E are secured the forward ends of the side braces T, the opposite ends of which are secured upon the ends of the rock-shaft U, passing through the rear of the frame A. These side braces T are made of malleable iron, or any malleable metal, and, in connection with the shafts E and U, sustain, in a great measure, the strain of the impression.

V shows the bed of the press, to receive the form or types from which an impression is to be taken. This bed is hung upon a rod, W, held in the frame A, and has secured upon its top or upper side, about centrally, a chase-hook, X, to clamp and hold the chase firmly in position upon the bed. This chase-hook is held between the lugs upon the rear of the bed by a pin passed through the lugs and the chase-hook, and while its rear end is fitted to the angle of the wedge sidewise, so that the pressure of the wedge shall be equalized, its forward end is curved or hooked, so that it shall bear upon and clamp the chase placed upon the bed.

That the chase-hook may be operated so that the chase may be readily placed upon or removed from the bed of the press, and that this operation may be accomplished quickly and from the side of the press, (the most convenient position for the operator,) I employ a wedge, *p*, formed upon the end of a rod, *q*, and the spiral spring *r*, the rod *q* having one end turned up to form a handle to be grasped by the operator when it is desired to withdraw the wedge from position below the chase-hook. This wedge runs across the bed, so to speak, and when it is drawn from beneath the rear end of the chase-hook the same may be depressed and its forward end elevated, thus allowing the chase to be removed from its position upon the bed. As the wedge is drawn from beneath the chase-hook, the spring *r*, confined between the wedge and a support, 6, through which the rod *q* is passed, is compressed, and upon the withdrawal of the hand of the operator from the handle this spring will be expanded, and the wedge will be returned to its place beneath the rear end of the chase-hook, elevating the rear end, and depressing the forward end over the upper edge of the chase. Held in lugs upon the rear of the bed V is a rod, Y, upon which are placed the impressional rollers Z, by which, in connection with the cams 1 upon the shaft U, the bed has a forward movement imparted to it that an impression may be given; and secured upon this rod, about centrally, are the collars 2, between which the upper end of a lever, 3, bears or is inserted. This lever is hung at or about its center upon a back brace, 4, and its lower end is provided with a roller, 5, playing in a surface-cam, 6, secured upon a rod, 7 held in the frame A. Upon one end of the rod 7 is secured a crank-arm, 8, to which is bolted one end of the connection 9, its opposite end being attached to the lever 10, held upon a stud secured in the frame A back of the platen, and within easy reach of the operator. U shows a rock-shaft passed through the frame A, and having upon its face the surface-cams 1, which, in connection with the impressional rollers Z, are employed to give a forward movement to the bed, that an impression may be taken. Over the ends of this shaft are passed the rear ends of the side braces T, and upon one end of this shaft is keyed a crank-arm, 11, in one end of which is secured a stud, 12, to receive one end of the connection 13, the opposite end of said connection being passed over a stud secured in the cog-wheel D. Upon this rock-shaft are held the roller-arms 14, similar in construction to ink-roller arms heretofore patented by me, and reference may be had to my patent of January 7, 1862, for a full description of the construction of the same. The roller arms receive and carry the form-inking rollers 15, over the ink-distributing table 21, and also over the form or types placed and held upon the bed. The roller-arms are provided with ear-pieces 16 at their rear upper ends, which form supports, to which the forward end of the carriers or holders 17 are attached, the rear ends of said carriers or holders receiving and carrying a supplemental ink-feed roller, 18. To these carriers or holders are attached the forward ends of the spiral springs 19, the rear ends of the same being attached to the roller-arms 14 by any convenient means.

20 shows a saddle placed back of and above the bed for supporting the ink-distributing table 21, the spindle of which passses through the saddle about centrally, and has secured upon its lower end the bevel-gear 22, gearing into the bevel-gear 23, placed at right angles to the bevel-gear 22, and secured upon the rod 24. Upon this rod, also, is secured a ratchet-wheel, 25, and a ratchet-arm, 26, supporting a stud, upon which is hung a double ratchet, or two ratchets formed in one piece, 27, so that either of the ratchets may engage with the ratchet-wheel 25, if desired.

28 shows a pin secured upon the ratchet-wheel, and 29 is a pin projecting downward from the double ratchet-piece about centrally, and made sufficiently long to engage with the pin 28.

30 shows an ink-cylinder placed behind the ink-distributing table 21, and supported upon a spindle, 31, upon one end of which is secured a scored pulley, 32, over which is passed a belt, 33. This belt also passes over a scored pulley, 34, secured upon one end of the driving-shaft, and from the driving-shaft through the belt the cylinder receives motion.

The cylinder may be supplied with ink from a fountain, or in any convenient manner. The ratchet-arm 26 has upon one end a roller, 35, playing in a cam, 36, secured upon the rock-shaft U.

Such being the construction, the operation may be thus set forth: We will suppose the tympan-sheet and packing to have been secured upon the platen by the bails, constructed and operating as already described, the chase in which the form or types is locked to have been secured upon the bed by the chase-hook, operated by the wedge, as described, and the gripers to relieve the printed sheet from the type to have been depressed upon the platen and adjusted, as already set forth. The form-inking rollers, which have been secured in the roller-arms, we will suppose to have reached the extent of their downward vibration, and the supplemental ink-feed roller to have passed over and off of the ink-distributing table. Motion being communicated to the driving-shaft sets all parts of the machine in motion. As the cog-wheel, deriving motion from the pinion, the roller, playing in the cam upon the inner side of the cog-wheel, rocks or turns the shaft E upward, so that the toggles, having their rear ends attached in lugs upon the shaft E, and their forward ends attached to the rear of the platen, are expanded or thrown out to their full extent, rocking or turning the platen upon the rod or shaft L, upon which it is hung, toward the bed in which is secured the form or types. As the platen, through the movement of the toggles, is rocked or turned toward the bed, that an impression may be given, the gripers, constructed and operated as already described, are closed upon the face of the platen and upon the sheet to be printed, ready to relieve the sheet from the types after an impression has been taken. During this movement of the platen, the rock-shaft connected with the cog-wheel, as described, and receiving motion from the same, has been rocked so that the surface-cams upon the same are brought to bear upon the impressional wheels, secured upon the rod held in the lugs upon the bed, and as these cams are brought into contact with the impressional wheels and the shaft continues to rock, the bed in which is secured the form or types is vibrated sufficiently forward to cause the types or form to be brought into contact with the paper and an impression to be taken, a dwell being given to the bed while giving the impression, and this dwell continuing during the movement of the rock-shaft, as more fully described.

The platen, while in the position to receive the impression, will be locked or held in this position by the same means employed to rock or turn it—the toggles; and this locking of the platen will be found of importance in enabling a job to be worked out of center, if desired, and in preventing any slur in the printing. The platen as it is rocked down has its bottom or lower edge brought to bear upon the frame of the press, and as the toggles are extended to their full extent they bear against the upper side of the platen. The platen, therefore, at the moment of impression is perfectly stationary, and, being confined, as shown, by the frame and toggles, cannot move until an impression has been given to the sheet and the backward movement of the platen commenced. During this movement of the bed and platen the form-inking rollers, held and carried in the roller-arms secured upon the rock-shaft, have been carried up over the ink-table, from which they receive a supply of ink, until they reach the highest point of their vibration, and the supplemental ink-feed roller held in the carriers or holders has been carried over the revolving ink-cylinder, from which it receives a supply of ink. An impression having been given, the rock-shaft E is rocked back to its former position, depressing or withdrawing the toggles from the position they occupied when the platen was in position to receive the impression; and as the platen is withdrawn from contact with the bed the toggles are depressed, and the platen rocks or turns upon the shaft L and returns to the position to receive the sheet to be printed, the gripers which have relieved the printed sheet from the form or types, and are operated, as already described, have been returned to the vertical, or nearly vertical, position they occupied originally, and as the rock-shaft continues its rocking motion the surface-cams are withdrawn from contact with the impressional wheels, and the bed vibrates to its former position.

During the return movement of the platen the form-inking rollers have been carried down and up over the form or types, the supplemental roller following after them, and while the supplemental roller is off the ink-table the cam upon the rock-shaft operates through the roller, the ratchet-arm imparting a forward movement to one of the two ratchets employed, which engages with the ratchet-wheel, causing the same to be advanced, and as the same is turned the bevel-gear placed at right angles to and engaging with the bevel-gear secured upon the under side of the ink-table is turned, communicating motion to the ink-table, and partially rotating the same, so that when the supplemental ink-feed roller passes up over the ink-table it cross-cuts the supply of ink it has previously placed on the table. A second sheet having been laid upon the platen, the operation just described is repeated.

I will now particularly describe the more important features of my invention. The first feature to which I would call attention is, that the platen of the press may be rendered inoperative or held in the position it occupies to receive the sheet to be printed for any desired length of time. This feature will be found particularly desirable when close register is required, or when more than one inking of the form is desired, or when the operator, while making ready, may desire the distribution of the ink to be going on. When it is desired to suspend the operation of the platen when in position to receive the sheet to be printed, the rocking-wedge is depressed between the pin on the stud-rod and the sleeve upon the crank-arm, giving a side movement to the stud-rod, and withdrawing the same and the roller upon it from within the cam in the cog-wheel. The helical spring, by this movement of the stud-rod, is compressed, so that when desired to again operate the platen the expansion of the spring, as the rocking-wedge is raised, will give to the stud-rod a lateral movement in the opposite direction, and the roller upon the end of the same will again enter within the cam in the cog-wheel. When the roller is removed from within the cam, the platen will remain stationary during the continuous movement of the other parts of the press.

A second feature is, the ability to suspend the operation of the bed in case a sheet should not have been properly laid upon the platen, or it is desired to suspend the impression for any purpose. That no forward movement may be given to the bed, the lever 10 is thrown forward, and the rod 7, to which the same is connected, is turned, so that the surface-cam 6 is turned also. As the surface-cam is turned, the roller attached to the lower end of the lever 3, hung upon the cross-brace, the upper end of which lever is inserted between the collars 2 upon the rod, upon which are secured the impressional wheels is operated by the cam, and the impressional wheels and rod supporting them are moved laterally, so that the surface-cams upon the rock-shaft will not be brought to bear upon them, and no forward movement will be given to the bed. The dwell given to the bed in giving an impression is also of importance. The cams employed to give the impression are raised upon the shaft U, the outer surfaces or impressional parts of the cams being in a true arc with the center of the shaft U, running from this outer arc down to the shaft, forming, as it were, wedged surfaces. When the shaft begins to rock the wedges bear upon the impressional wheels, and the forward movement of the bed begins, and upon the further movement of the impressional wheels the impressional parts of the cams are brought to bear against the wheels and remain in contact with the same, the dwell being determined by the time occupied in rocking the rock-shaft up and back.

Particularly advantageous will be found the fact that in the present invention are combined a platen and a bed, either of which may be rendered inoperative if desired.

The means of distributing the ink, and the operation of the same, should be more fully spoken of.

As already stated, the supplemental ink-feed roller imparts a supply of ink to the ink-table as the form-inking rollers are passed down over the type. The ink-table is partially rotated after the supplemental ink-feed roller has passed over it, and upon the return movement of this supplemental ink-feed roller it cross-cuts the ink previously supplied to the table, thus materially assisting in breaking up the ink and preparing it to be taken from the table by the form-inking rollers. In addition, however, and with a view to provide for the most thorough possible distribution of the ink, and to prevent the accumulation of the ink upon either one side or the other side of the table, the ink-table, after it has made a full revolution in one direction, has its movement reversed, and proceeds to revolve in the opposite direction, alternating from one of these movements to the other.

The means employed to effect this change have already been described—namely, the bevel-gearing, and the double ratchet and ratchet-wheel, and pins 28 and 29. The ratchet-wheel is revolved until the pin secured in the rod upon which the ratchet-wheel is secured is brought into contact with the pin secured upon the double ratchet, elevating one ratchet and depressing the other, so as to engage with the ratchet-wheel and reverse the movement of the ratchet-wheel, and, through the bevel-gearing, reverse the movement of the ink-table and cause it to turn in the opposite direction, thus equalizing the distribution of the ink and preventing the accumulation of ink either upon one side or the other side of the ink-table.

The platen, as already stated, is hung upon a shaft or rod, the center of which is at a right angle from the lower edge of the platen, or nearly so. It is thus hung that the platen may move through the small arc of the circle, and yet move sufficiently to allow the form-inking rollers to pass down and up over the form; but the great advantage resulting from thus hanging the platen is, that only a short throw or forward movement of the bed is rendered necessary that an impression may be given, and, as a sequence, only a small expenditure of power is necessary to give to the bed the forward movement necessary for an impression.

Having thus set forth my invention, what I claim as new is—

1. A platen, supported and held in position to receive the strain of the impression from a movable bed by two horizontal shafts placed back of its face-line, one shaft at or near its center, and one shaft at or near its bottom, upon which latter shaft the platen rocks or turns freely to a proper position for the reception of the sheet, and alternates from one of these positions to the other, operated and operating substantially as and for the purposes set forth.

2. The combination with the chase-hook, of the wedged rod and spiral spring, placed and operating as shown.

3. The combination of a bed and platen, the motion of either of which may be suspended during the continuous movement of the other parts of the press, as and for the purposes set forth.

4. The combination of the roller-arms 14, with the holders 17 pivoted thereto, and springs 19, substantially as shown.

GEO. P. GORDON.

In presence of—
A. SIDNEY DOANE,
W. E. WINSLOW.